(12) United States Patent
Sanchez et al.

(10) Patent No.: US 11,581,949 B1
(45) Date of Patent: Feb. 14, 2023

(54) TRANSITION-BASED, NONLINEAR EQUALIZATION FOR OPTICAL TRANSMISSION

(71) Applicant: HEWLETT PACKARD ENTERPRISE DEVELOPMENT LP, Houston, TX (US)

(72) Inventors: Ronaldo Sanchez, Ft. Collins, CO (US); Gilbert Yoh, Ft. Collins, CO (US); Zhubiao Zhu, Ft. Collins, CO (US); Daniel Alan Berkram, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/461,407

(22) Filed: Aug. 30, 2021

(51) Int. Cl.
*H04B 10/00* (2013.01)
*H04B 10/58* (2013.01)
*H04B 10/2543* (2013.01)

(52) U.S. Cl.
CPC ......... *H04B 10/58* (2013.01); *H04B 10/2543* (2013.01)

(58) Field of Classification Search
CPC ............................ H04B 10/58; H04B 10/2543
USPC ........................................................ 398/197
See application file for complete search history.

(56) References Cited

U.S. PATENT DOCUMENTS

| | | | | |
|---|---|---|---|---|
| 2011/0064155 | A1* | 3/2011 | Ashita | H04L 27/368 375/260 |
| 2017/0078027 | A1* | 3/2017 | Okabe | H04B 10/548 |
| 2017/0214470 | A1* | 7/2017 | Nishihara | H04B 10/5057 |

OTHER PUBLICATIONS

Gao, Y., et al., "112 GB/s PAM-4 using a directly modulated laser with linear pre-compensation and nonlinear post-compensation". ECOC 2016; Sep. 18, 2016, pp. 3.
Hecht, U., et al., "Non-Linear PAM-4 VCSEL Equalization and 22nm SOI CMOS DAC for 112Gbit/s Data Transmission", GeMiC 2019, Mar. 25, 2019, pp. 4.

\* cited by examiner

*Primary Examiner* — Mohammad R Sedighian
(74) *Attorney, Agent, or Firm* — Sheppard Mullin Richter & Hampton LLP

(57) ABSTRACT

An optical or an optoelectronic device and methods are provided for data transmission across two interconnects. First, an electrical signal is obtained from an interconnect. Next, the electrical signal is modulated. Within the modulated electrical signal, an occurrence of a transition is determined, in which a change in a power of the electrical signal by more than a threshold amount. In response to the determination of the occurrence of the transition, coefficients indicative of respective amounts of compensation to resolve or mitigate nonlinearities associated with the transition are determined. According to the coefficients, a filter is applied in a vicinity of the transition to obtain a modified electrical signal. The modified electrical signal is converted into an optical signal and coupled to a fiber to transmit the optical signal to a destination at a second interconnect.

20 Claims, 11 Drawing Sheets

TRANSITION-BASED, NONLINEAR EQUALIZATION FOR OPTICAL TRANSMISSION

BACKGROUND

Data traffic and data exchange have been skyrocketing, as approximately 90% of the world's data has been created within the last two years alone. Currently, data demand is expected to grow by 40% annually. The increase in data traffic and exchange is manifested particularly in machine-to-machine traffic, such as, between servers, racks, switches, ASICs (application-specific integrated circuits), and other computing components, and within data centers. Moreover, applications in machine learning and artificial intelligence, which have high computing resource consumption, may harness high network performance and connectivity at all levels of a computing hierarchy. Additionally, transmission speeds, such as broadband speed, Wi-Fi speed, and mobile speed, are predicted to double or triple by 2023 compared to the respective speeds in 2018. Thus, in order to support the ever-increasing demands of data exchange at high speeds, researchers have undertaken efforts to develop improved optical and optoelectronic devices to be used as communication links between computing components. Due to rapid increases in data rate and transmission speeds, optical and optoelectronic devices have slowly begun to replace electronic links, such as copper cables, due to attenuation or distortion of signals, as attributed to skin effect and frequency-dependent dielectric losses through electronic links, especially at high data rates such as rates over 100 Gigabits per second (Gbps).

Photonic devices, such as coherent and non-coherent silicon or indium phosphide transceivers, and intensity modulation and direct detection (IM/DD) technologies such as directly modulated lasers (DMLs), electro-absorption modulated lasers (EMLs), Mach-Zehnder modulators (MZMs), monolithic integrated transmitters, and vertical-cavity surface-emitting Lasers (VCSELs) are increasingly being deployed as optical links to transmit data. In particular, applications of VCSELs, particularly in short-reach optical interconnects and longer wavelength VCSEL applications, have reached fruition. VCSELs may offer cost efficiency, energy efficiency, and small footprint, thereby being tailored to low power consumption and high bandwidth density applications. Additionally, VCSELs may produce circular output beams having less divergence, can be fabricated in arrays due to its monolithically integrated structure which requires a single epitaxial run, and support on-wafer testing. However, some limitations of VCSELs may include bandwidth limitations and nonlinear responses. Transmitter bandwidths of VCSELs are limited by intrinsic laser response, such as, a rate equation-dependent process of converting laser current to optical output, resonant interactions between carrier and photon during a stimulated emission process, and extrinsic parasitic circuit components between the intrinsic laser and a driving circuit, such as driver output capacitance, inductance, and bias-dependent VCSEL impedance. Because current optical links are targeting speeds with a bandwidth larger than 100 Gbps, efforts have been undertaken to counter the limitations of bandwidths. Such efforts to increase bandwidths, however, may result in nonlinearities such as gain nonlinearities and/or relaxation nonlinearities, which could affect the integrity of transmitted data, as well as other undesirable tradeoffs. The nonlinearities may be attributed in part to increased damping effects upon application of a bias current. Although operating the VCSELs at higher average bias currents may improve a linearity of a response to input data, higher current levels may result in an undesirable reduction of a mean time to failure (MTTF) and higher power consumptions. Therefore, rectifying nonlinearities is a currently unresolved issue that has prevented the benefits of optical links such as VCSELs from being fully harnessed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a non-limiting example; other devices which may cause nonlinearities in a signal, which are to be resolved, are also contemplated.

The figures are not exhaustive and do not limit the present disclosure to the precise form disclosed.

DETAILED DESCRIPTION

Certain aspects of resolving nonlinearities within an input signal, which may be attributed to properties of a device through which the input signal is transmitted, are depicted below. In particular, as will be described with respect to FIG. 4, some of the nonlinearities include reflections and ringing, as manifested by overshoots and undershoots, and nonlinear relaxation, for example, at tails of the reflections. The resolving of the nonlinearities may entail adjusting amplitudes and phases of portions of the input signal. For example, signals may be selectively incorporated or added into the input signal and localized in a vicinity of transitions of the input signal, during which power of the input signal changes by more than a threshold amount. Different coefficients, which may signify different amounts of signal to be incorporated, may be applied depending on whether the transition is a local maximum or a local minimum, and/or on an extent or an amount of the transition. Meanwhile, because the incorporated signals are localized, steady-state power levels in non-transition regions of the input signal may be maintained. This technique will be described in more detail with reference to the FIGS. 1-4, 5A, 5B, and 6-9. Such a technique is an improvement over other methods of nonlinearization, such as feed-forward equalization (FFE). FFE utilizes a finite impulse response (FIR) filter which implements only a single coefficient, meaning that a same signal is added or incorporated no matter whether the transition is a local maximum or a local minimum. FFE would result in a change in a steady-state power level in at least some portions of the input signal, further triggering undesired nonlinear behavior, power concerns, and increased bit error rate.

Figure 1:
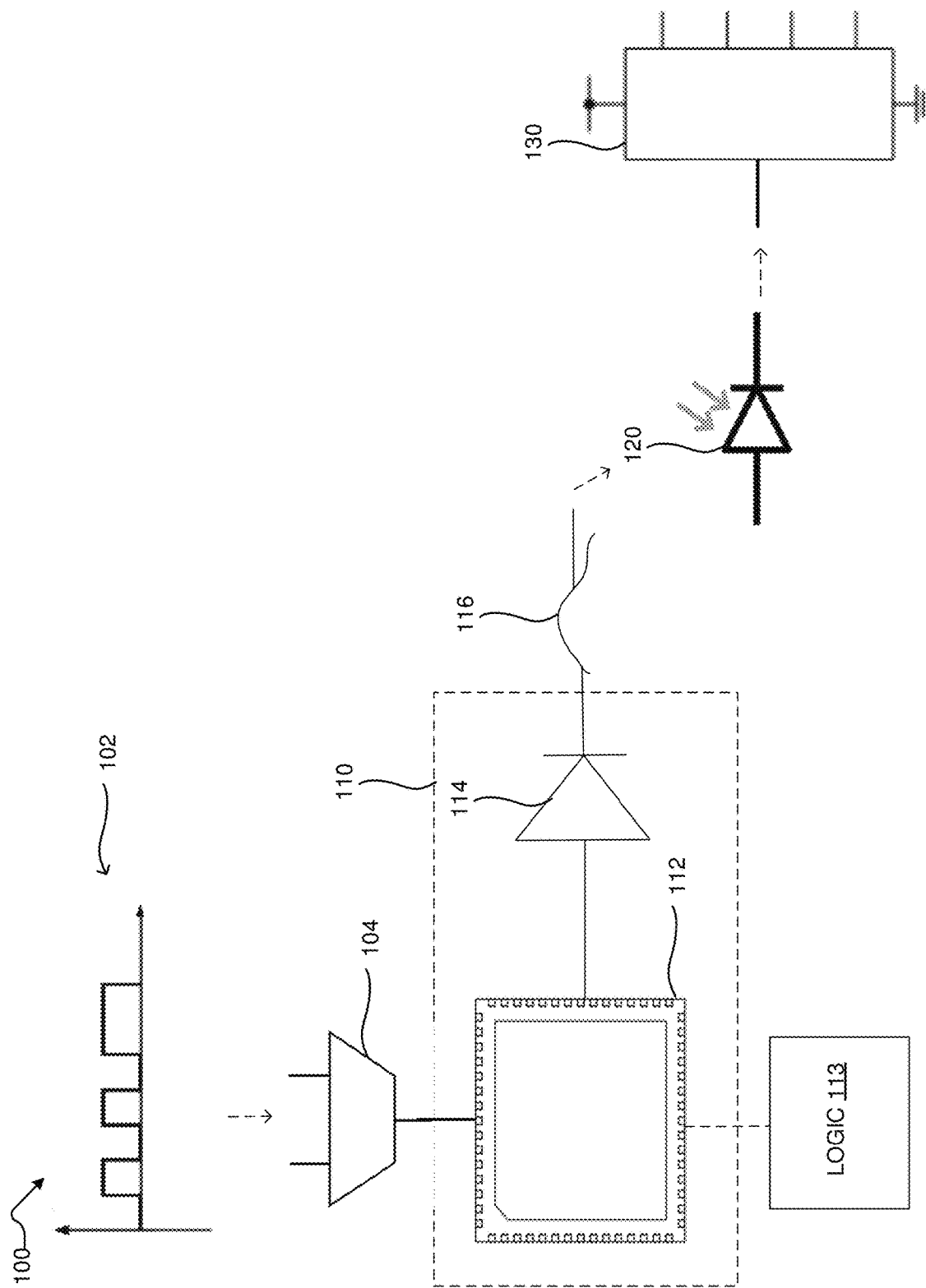
FIG. 1 is an example illustration of a process by which nonlinearities in a signal, which may be attributed to a device and are transmitted through the device, are resolved, according to embodiments described in the present disclosure.

FIG. 1 illustrates a process 100 by which nonlinearities in a signal are resolved. In FIG. 1, a plurality of parallel input signals 102 may be multiplexed using a multiplexer 104 (e.g., a serializer/deserializer or SerDes) to serialize the plurality of parallel input signals into a single high-speed output signal and fed into a device 110, through which the high-speed output signal 102 may be transmitted. As will be alluded to in FIG. 2, the device 110 may include a VCSEL, but is not limited to such. The device 110 may encompass any type of optical or optoelectronic transmission device. As particular nonlimiting examples, the device 110 may include a laser diode, a superluminescent diode, a light-emitting diode (LED), a photodetector such as a photodiode or phototransistor, an imaging detector, an electroabsorption modulator, a photonic integrated circuit, a phototube, or a photomultiplier. Particular examples of laser diodes may include DMLs, EMLs, MZMs, monolithic integrated transmitters, and VCSELs.

The device 110 may include a driver 112 and a diode 114 which may convert an electrical signal, such as the high-speed output signal, into an optical signal. As the high-speed output signal is fed into and/or transmitted through the device 110, nonlinearities in the high-speed output signal may result due in part to bandwidth limitations of the device 110, as previously alluded to. The driver 112, which may include embedded logic 113, may resolve or at least mitigate the nonlinearities of the high-speed output signal without triggering additional undesired properties of the input signal 102, such as increased bit error rate and/or changes in steady state power. The driver 112 may include a digital-to-analog converter (DAC) based driver. The driver 112 may modulate the high-speed output signal, for example, according to a PAM-4 or NRZ encoding mechanism. After the nonlinearities of the high-speed output signal have been resolved, the resolved signal may be fed to the diode 114, which modulates and converts the resolved signal into an optical signal. The optical signal may be transmitted via a fiber 116 to a receiver, and/or a photodetector 120 including a photodiode, which converts the optical signal back into an electric signal. This converted electric signal may then be converted back into a digital signal using an analog-to-digital converter (ADC) and/or demultiplexed (e.g., deserialized) into parallel signals using a demultiplexer 130.

Figure 2:
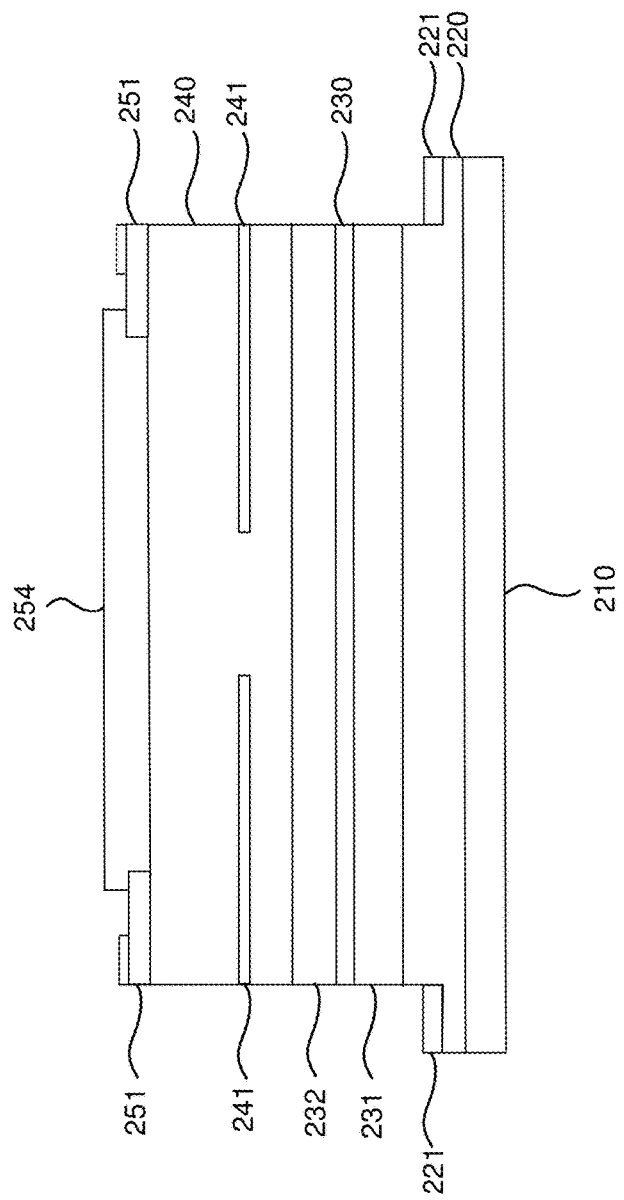
FIG. 2 is an example of a device, such as an optical interconnect device, according to FIG. 1.

FIG. 2 illustrates an example cross-sectional view of a spatial organization of the device 110. The device 110 may include a VCSEL, but is not limited thereto. The device 110 may be fabricated using a Chemical-Vapor Deposition (CVD) method such as a metal organic CVD (MOCVD) method. The device 110 may include a substrate 210, such as a GaAs substrate, and epitaxial layers 220 and 240, which may include distributed Bragg reflectors. The epitaxial layers 220 and 240 may include reflective mirrors having quarter-wavelength-thick layers of semiconductors of alternating high and low refractive index. The epitaxial layer 220 may be n-doped, for example, using AlGaAs. The epitaxial layer 240, meanwhile, may be p-doped and further include an oxidized layer 241. An active layer 230 that includes quantum wells may be disposed between spacers 231 and 232 which may be cladding layers, as an example. The quantum wells may be in a form of InGaAs/AlGaAs multiple quantum wells. The quantum wells may generate laser light. Current may be injected through p-electrodes 251 of the device, while n-electrodes 221 may be connected to the epitaxial layer 220 and/or the substrate 210. A passivation layer 254 may be connected to the p-electrodes 251. The output beam of the device 110 may be orthogonal to a top substrate of the device 110, as opposed to edge-emitting semiconductor lasers, which emit in a direction parallel to a substrate. The relatively small active region 230 may keep a threshold current low, thereby resulting in low power consumption.

Figure 3:
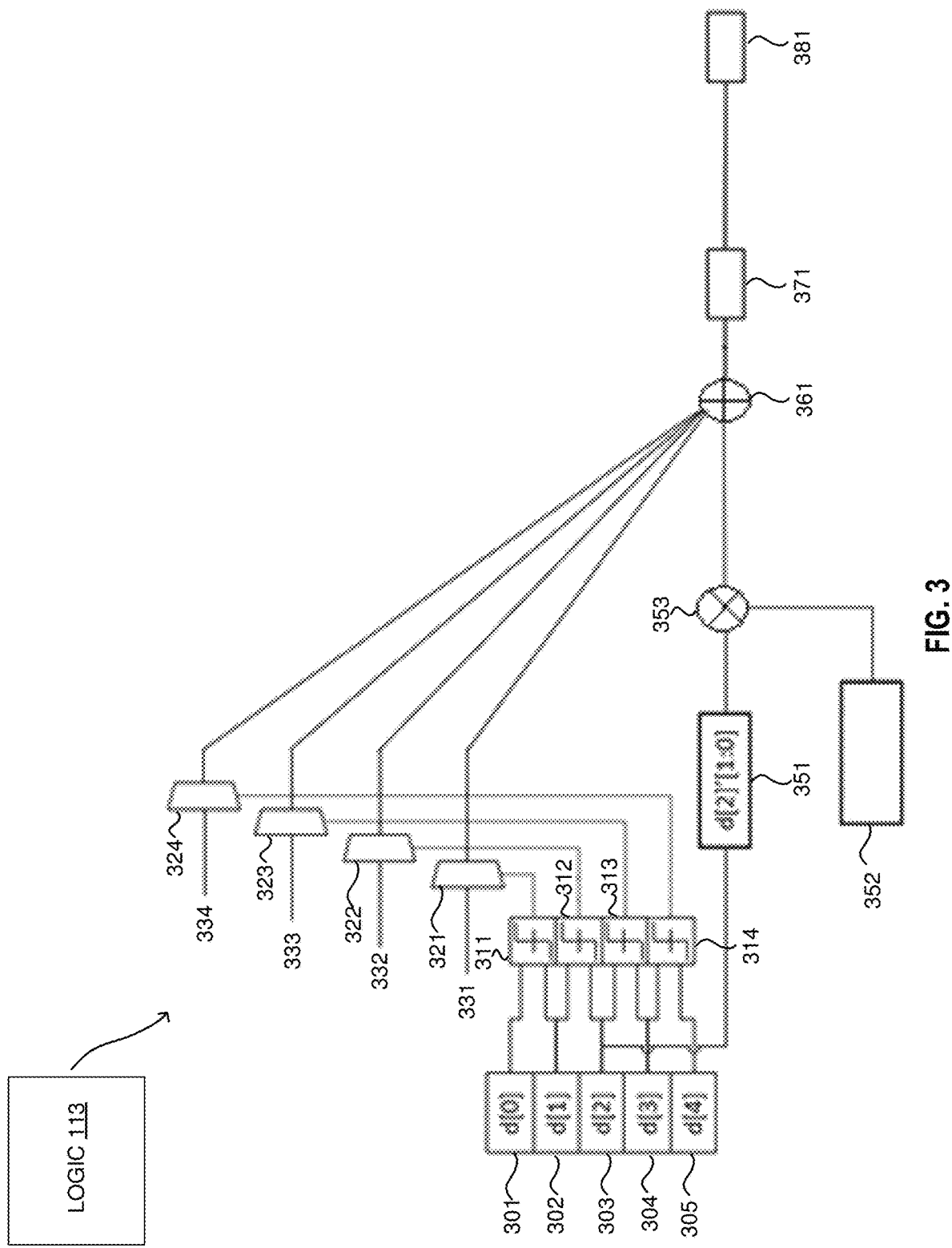
FIG. 3 is an example block diagram of logic embedded within a device, such as the device illustrated in FIG. 2. The logic may resolve nonlinearities of an input signal.

FIG. 3 illustrates an example implementation of the logic 113 which may be comprised within the driver 112. The logic 113 may include a circuit or other series of electronic components that may resolve, eliminate, or otherwise mitigate nonlinearities, such as reflections and/or ringing, that have been introduced into the high-speed output signal. In some embodiments, the logic 113 may not utilize machine learning or neural networks. The logic 113 may selectively apply coefficients to add the high-speed output signal only at times in the vicinity of a transition, such as, one or two unit intervals (UIs) before and/or after a transition. A UI may be defined based on or respective to a sampling frequency or rate of the high-speed output signal. For example, if values or parameters of the high-speed output signal are collected every picosecond, then a UI may be defined as a picosecond. A transition may include a local maximum in power (e.g., signal power) or a local minimum in power. Therefore, the logic 113 may smooth out nonlinearities without affecting a steady state power at any portion of the high-speed output signal, thereby reducing a bit error rate of the high-speed output signal. In a scenario of PAM-4 encoding, five consecutive 2-bit codes 301, 302, 303, 304, 305 may be fed into the logic 113 to determine whether a transition is impending, and/or at what time period a transition is impending. The logic 113 may determine a presence of a transition at each distinct level corresponding to the PAM-4 encoding. Other encoding methods may also be applicable, such as non-return-to-zero (NRZ) encoding. In some embodiments, the logic 113 may determine whether a transition is impending based only on the five aforementioned consecutive 2-bit codes 301, 302, 303, 304, 305. If the logic 113 determines that a transition is impending, the logic 113 may then determine whether the transition is a rising edge, which has a local maximum, or a falling edge, which has a local minimum. The logic 113 may make such a distinction because coefficients to be applied to a transition would differ depending on whether the transition is a rising edge or a falling edge. In some embodiments, the 2-bit codes 301, 302, 303, 304, and 305 may correspond to consecutive data symbols at respective successive sequential times, from earlier to later. In particular, the 2-bit code 303 may be taken at a particular time period or a particular cycle at which the logic 113 is determining whether to apply a coefficient, while the 2-bit codes 301 and 302 may be previous cycles or time periods before the particular cycle and the 2-bit codes 304 and 305 may be subsequent cycles or time periods following the particular cycle.

Once the 2-bit codes 301, 302, 303, 304, and 305 are extracted from the high-speed output Signa, consecutive 2-bit codes corresponding to successive time periods may be fed to a quantizer. In particular, the consecutive 2-bit codes 301 and 302 may be fed to a quantizer 311; the consecutive 2-bit codes 302 and 303 may be fed to a quantizer 312; the consecutive 2-bit codes 303 and 304 may be fed to a quantizer 313; the consecutive 2-bit codes 303 and 304 may be fed to a quantizer 314. In some embodiments, the quantizers 311, 312, 313, 314 may each include a 1-bit quantizer. Outputs from the quantizers 311, 312, 313, 314 may be multiplexed at multiplexers 321, 322, 323, and 324 in order to determine a presence of a transition, and/or whether the transition is a rising edge or a falling edge. If the logic 113 determines a presence of a transition, the logic 113 may then apply a filter according to coefficients or parameters (hereinafter "coefficients") in order to resolve the rising edge or the falling edge, at times of one or two UIs (e.g., time intervals) prior to the transition, and one or two UIs following the transition. In some embodiments, the coefficients may be applied to both amplitude and phase skews in the high-speed output signal based on a particular step response at a transition. The coefficients may indicate an amount or extent of an adjustment to be applied in order to resolve the nonlinearities. In such a manner, the coefficients would be selectively applied in a time region near the transition without applying the coefficients across a large portion of the high-speed output signal, which may affect a steady-state power of the high-speed output signal and thereby impact an integrity of the high-speed output signal and/or increase a bit error rate. The logic 113 may determine the coefficients to be applied based on lookup tables 331, 332, 333, and 334, each respectively containing 16 different eight bit values, at each UI prior to and/or following the transition. The lookup tables 331 and 332 may correspond to the coefficients to be applied prior to a transition while the lookup tables 333 and 334 may correspond to the coefficients to be applied following the transition. The lookup tables 331, 332, 333, and 334 may be based on a proportional integral derivative (PID) control or filter, of which a set point is a steady-state power level corresponding to each transition. In particular, the lookup tables 333 and 334 may further resolve tail regions that immediately follow a transition or a reflection. The tail regions may include, for example, a slight dip in a power level immediately following a rising edge, or a slight increase in a power level immediately following a falling edge. The tail regions may be separately accounted for, because they may not be guaranteed to cancel out, as would be the case in a linear system. Resolving of the transitions may be based on a derivative component of the PID control, while resolving of the tail regions may be based on an integral component of the PID control.

The logic 113 may rearrange or change a representation of a current 2-bit code 303, to a representation 351, based on particular parameters such as step sizes and number of steps of the driver 112. In a scenario of a DAC-based driver, the 2-bit code 303 may be rearranged such that a value of 0 is now represented as negative 3, a value of 1 is represented as negative 1, a value of 2 is represented as 1, and a value of 3 is still represented as 3, in the representation 351. The logic 113 may, at a mixer 353, apply a scaling factor 352 to the representation 351. In some embodiments, the scaling factor 352 may reduce an amplitude of a signal to provide adequate headroom for adjustments, so that power levels would stay within bounds or scales of rails of the driver 112. In some embodiments, the scaling factor 352 may be a 7-bit signed value, of which a range is between negative 63 and 63. An output following the mixer 353 may have a range of between negative 191 and 191. The coefficients previously determined from the lookup tables 331, 332, 333, and/or 334 may then be added to the output at an adder 361. A range of a resulting output following the adder 361 may be from negative 1023 to 1023, of which a usable range may be from negative 571 to 571. At stage 371, the resulting output may be divided by eight to convert the range to negative 127 to 127, while converting the usable range from negative 72 to 72. Following division by eight, the resulting output may be further converted using a DAC 381. In some embodiments, the DAC 381 may convert the resulting output to a 15-bit code using a control and status register (CSR)-based lookup table. As alluded to in FIG. 1, this converted output may be fed to a diode which converts the electrical signal into an optical signal to be transmitted across a fiber.

Figure 4:
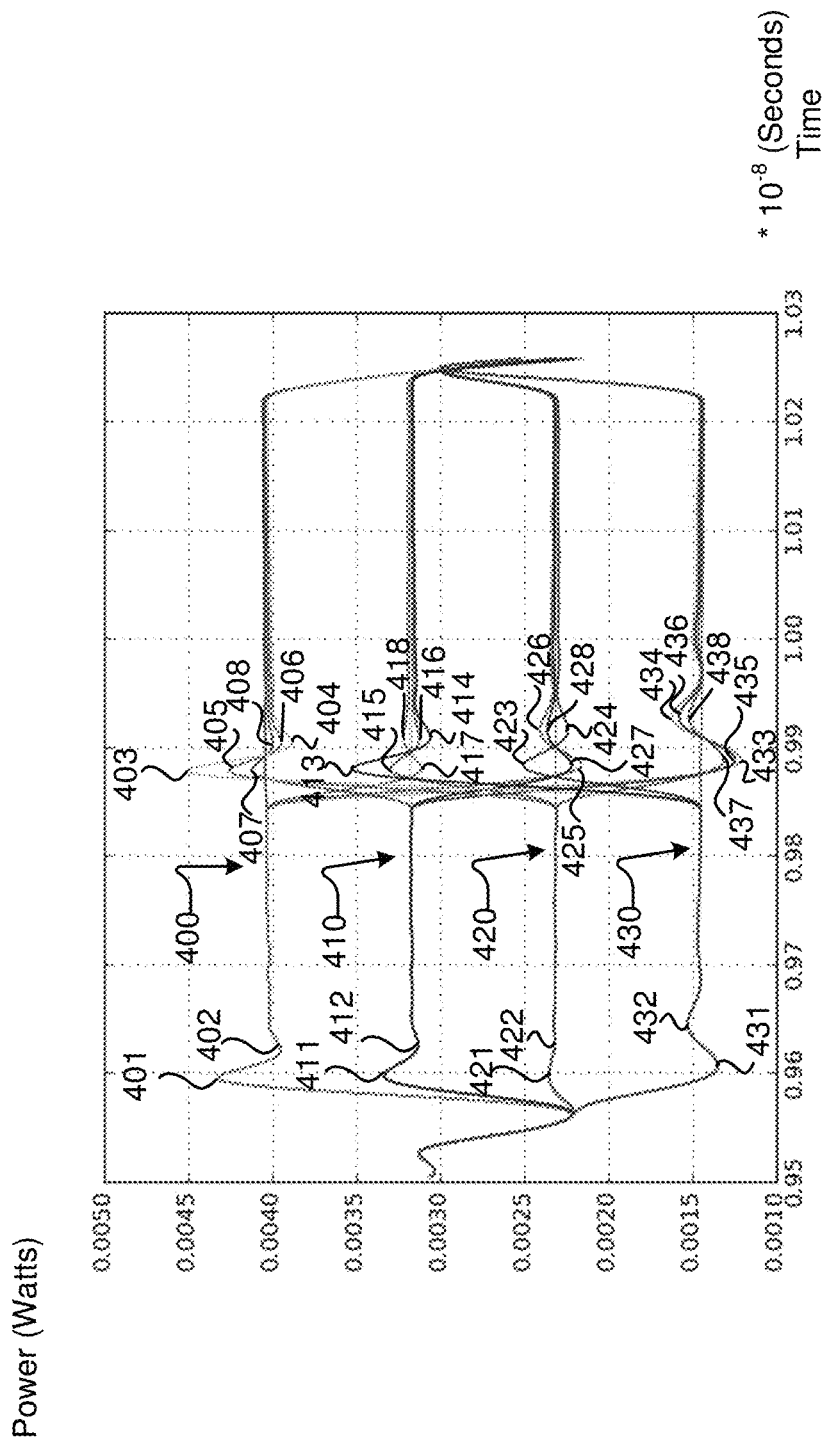
FIG. 4 is an example step response of a device-based driver, according to Pulse Amplitude Modulation 4-level (PAM-4).

FIG. 4 illustrates an example step response of a device-based driver, such as the driver 112, according to a Pulse Amplitude Modulation 4-level (PAM-4) encoding. In particular, the device 110 may cause nonlinear responses such as reflections and ringing within the input signal 102. The PAM-4 encoding may include levels 400, 410, 420, and 430, and step responses at each of the levels 400, 410, 420, and 430. In particular, a rising edge or local maximum 401 and a tail region 402 may be present at the level 400. A rising edge 411 and a tail region 412 may be present at the level 410. A rising edge 421 and a tail region 422 may be present at the level 420. A falling edge 431 and a tail region 432 may be present at the level 430. A transition from the level 430 to a top power level, corresponding to the level 400, is manifested as a rising edge 403 and a tail region 404. A transition from the level 420 to the top power level is manifested as a rising edge 405 and a tail region 406. A transition from the level 410 to the top power level is manifested as a rising edge 407 and a tail region 408. Meanwhile, a transition from the level 430 to a second highest power level, corresponding to the level 410, is manifested as a rising edge 413 and a tail region 414. A transition from the level 420 to a second highest power level, corresponding to the level 410, is manifested as a rising edge 415 and a tail region 416. A transition from the level 400 to the second highest power level, corresponding to the level 410, is manifested as a falling edge 417 and a tail region 418. Meanwhile, a transition from the level 430 to a third highest power level, corresponding to the level 420, is manifested as a rising edge 423 and a tail region 424. A transition from the level 410 to the third highest power level, corresponding to the level 420, is manifested as a falling edge 425 and a tail region 426. A transition from the level 400 to the third highest power level, corresponding to the level 420, is manifested as a falling edge 427 and a tail region 428. A transition from the level 400 to a lowest power level, corresponding to the level 430, is manifested as a falling edge 433 and a tail region 434. A transition from the level 410 to a lowest power level, corresponding to the level 430, is manifested as a falling edge 435 and a tail region 436. A transition from the level 420 to a lowest power level, corresponding to the level 430, is manifested as a falling edge 437 and a tail region 438. The falling edges, rising edges, and tail regions may be resolved according to the logic 113 as described in FIG. 3, which resolves both amplitudes, shown as vertical skew, and phase differences, shown as horizontal skew among the different step responses, among the step responses. For example, vertical skew may be manifested as overshoots corresponding to rising edges such as the rising edges 401, 411, and 421, and undershoots corresponding to falling edges such as the falling edge 431. Meanwhile, horizontal skew may be manifested as corresponding transitions or step responses of different power levels occurring at different times, when they should be occurring substantially simultaneously.

Figure 5A:
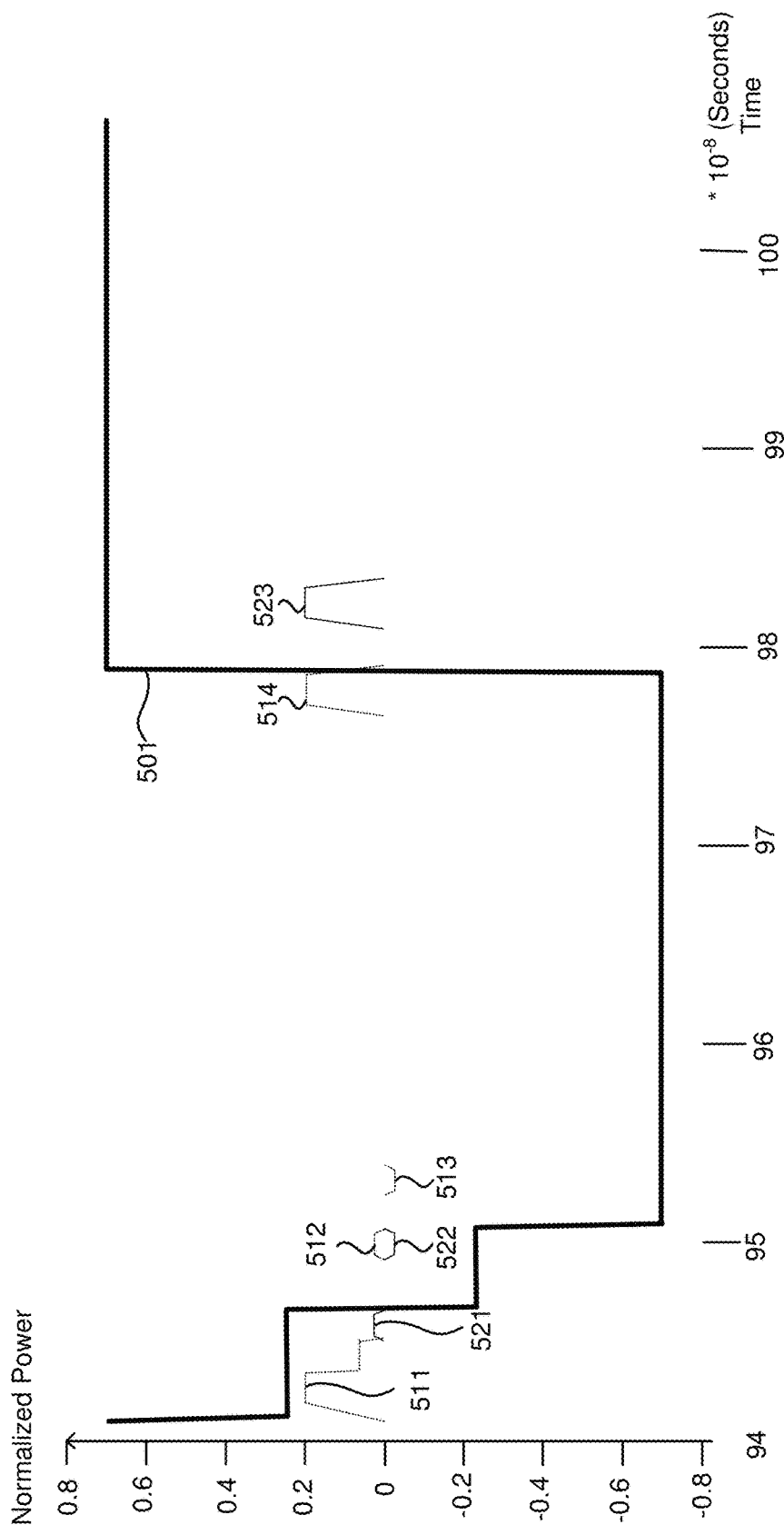
FIG. 5A is an example implementation of the logic as illustrated in FIG. 3, illustrating how the logic resolves the nonlinearities of an input signal.
Figure 5B:
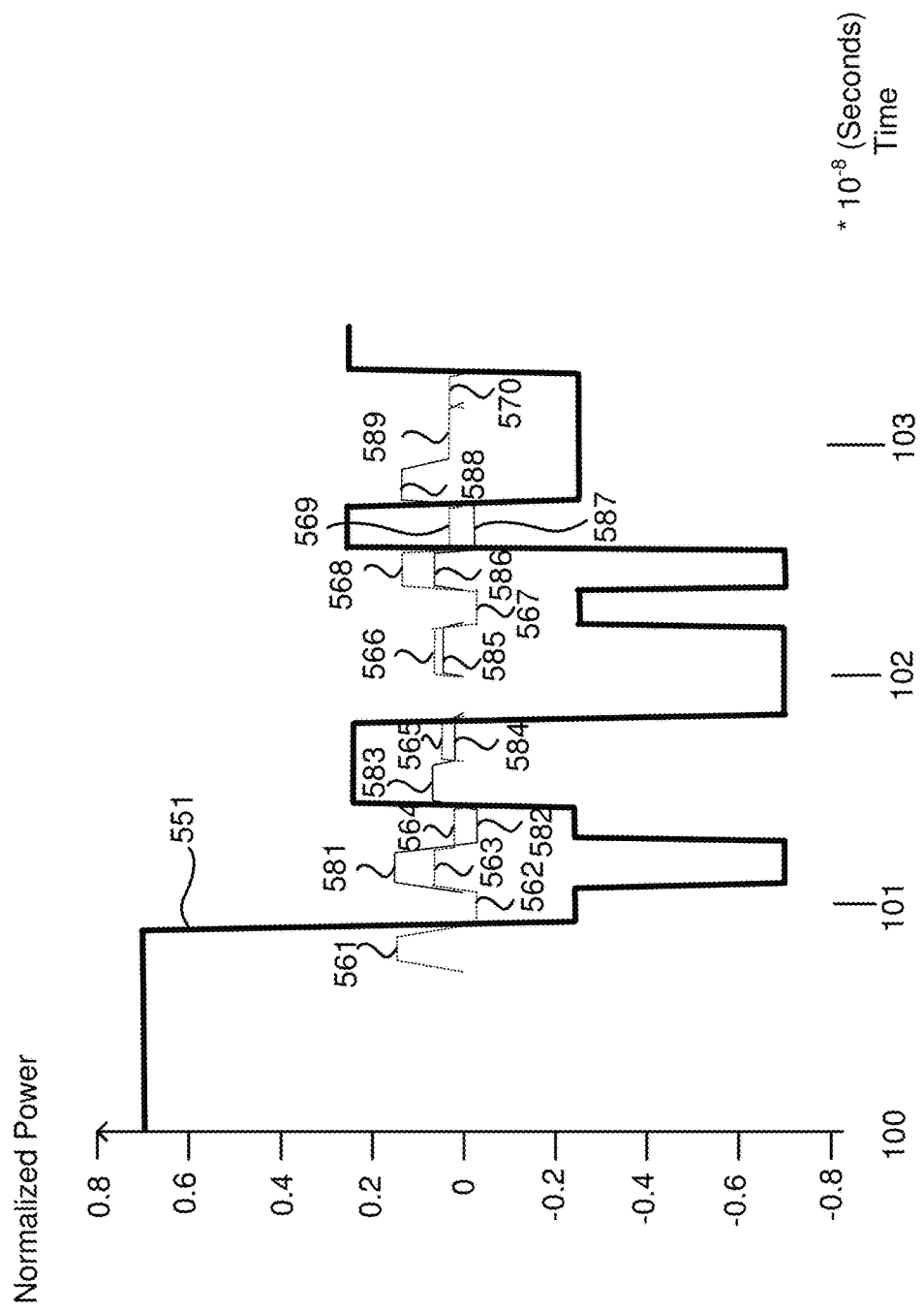
FIG. 5B is an extension of FIG. 5A, illustrating how the logic resolves the nonlinearities of an input signal over a time period extended from that shown in FIG. 5A.

FIGS. 5A and 5B illustrate resolved signals 501 and 551 following the application of coefficients, as described with respect to FIG. 3. The resolved signal 551 may be part of a same signal as the resolved signal 501. The resolved signal 551 may correspond to time range following $100*10^{-8}$ seconds, while the resolved signal 501 may correspond to a time range prior to $100*10^{-8}$ seconds. In particular, in FIG. 5A, the resolved signal 501 may have been resolved following an application of coefficients 511, 512, 513, and 514, which may be applied immediately before a local maximum or a local minimum, for example, one or two UIs prior to a local maximum or a local minimum. The coefficients 511, 512, 513, and 514 may correspond to the coefficients 331 and/or 332 of FIG. 3. Meanwhile, coefficients 521 and 522 may be applied immediately following a local maximum or a local minimum, for example, one or two UIs following a local maximum or a local minimum. The coefficients 521 and 522 may correspond to the coefficients 331 and/or 332 of FIG. 3. At certain time intervals, no coefficients may be applied. For example, between approximately $95.5*10^{-8}$ and $97.5*10^{-8}$ seconds, and between $98.5*10^{-8}$ and $100*10^{-8}$ seconds, no coefficients are applied. Moreover, in FIG. 5B, the resolved signal 551 may have been resolved following an application of coefficients 561, 562, 563, 564, 565, 566, 567, 568, 569, and 570, which may be applied immediately before a local maximum or a local minimum, for example, one or two UIs prior to a local maximum or a local minimum. Meanwhile, coefficients 581, 582, 583, 584, 585, 586, 587, 588, and 589 may be applied immediately following a local maximum or a local minimum, for example, one or two UIs following a local maximum or a local minimum. As shown in FIG. 5B, more than one set of coefficients may be applied at a given time, for example, one set of coefficients being applied immediately before and corresponding to a particular transition while another set of coefficients is applied immediately after and corresponding to a different transition, such as, the coefficients 581 and 563 being applied simultaneously. Additionally, an application of one set of coefficients may immediately transition to another application of another set of coefficients, rather than going to zero, for example, if one transition immediately follows another transition, such as, the coefficients 562 immediately following the coefficients 561.

Figure 6:
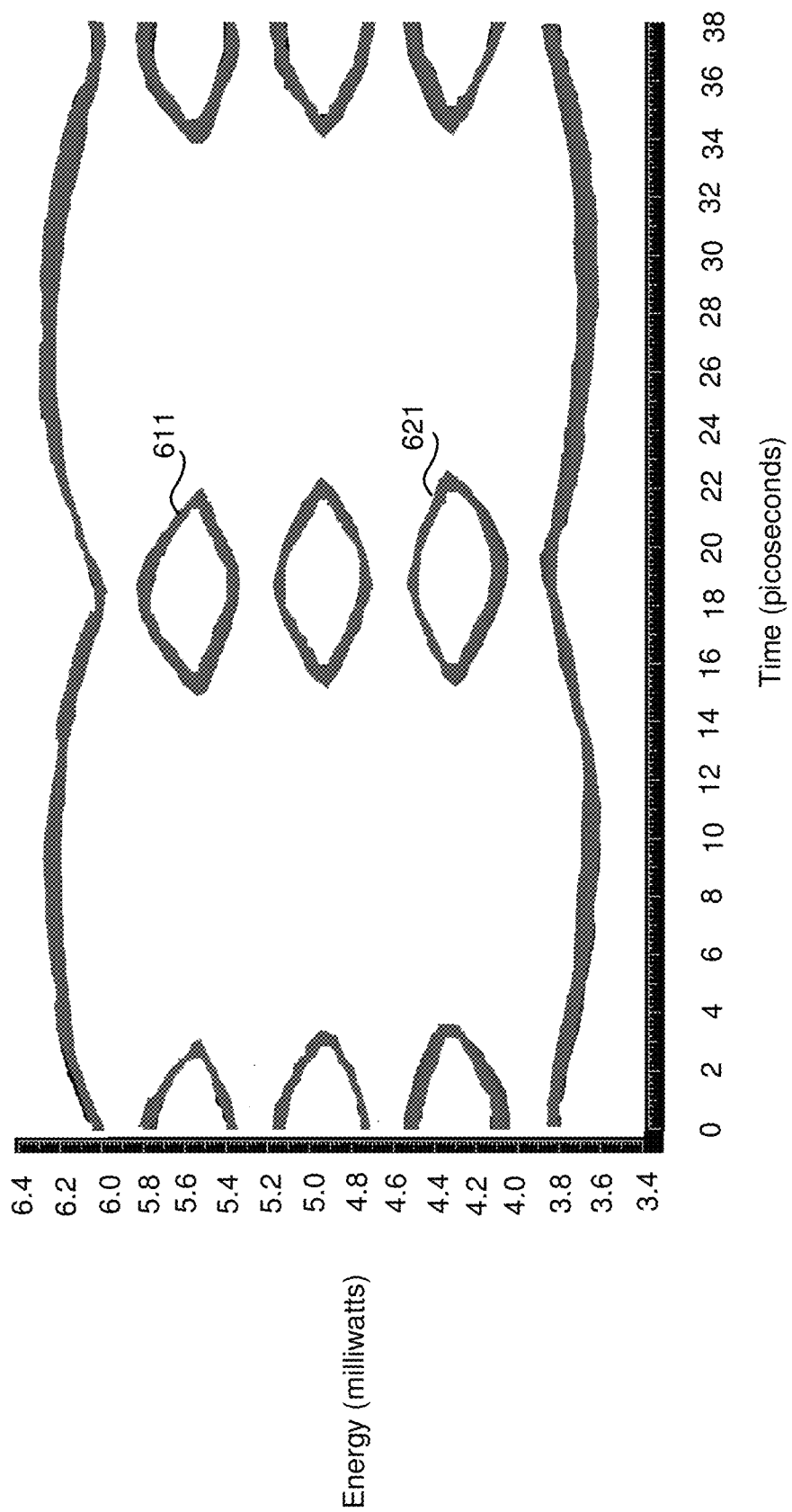
FIG. 6 is an example eye diagram following the implementation in FIGS. 5A and 5B.
Figure 7:
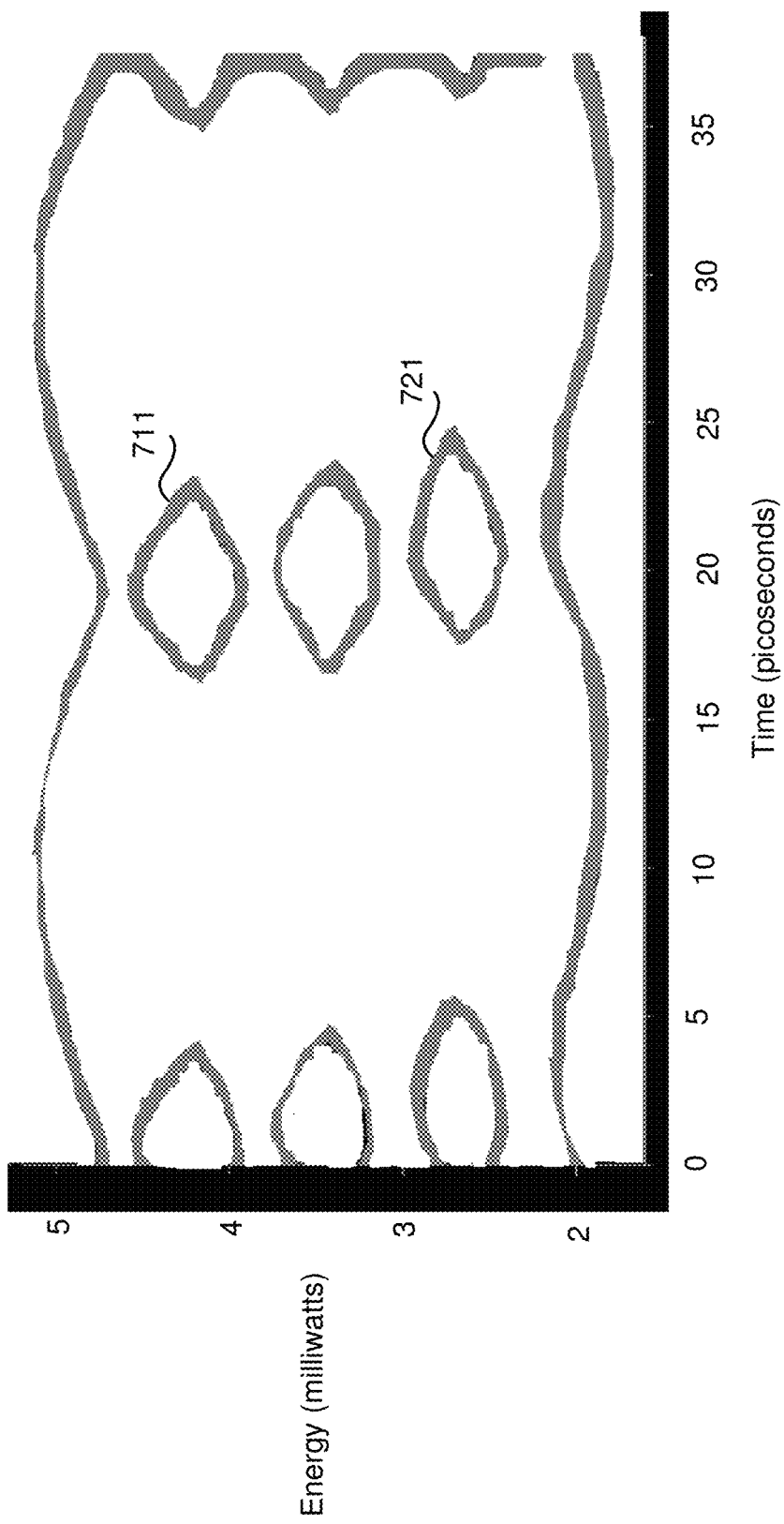
FIG. 7 is an example eye diagram following an attempt to resolve nonlinearities according to an alternative method.

FIG. 6 illustrates an example eye diagram following the resolution of the nonlinearities, in accordance with the logic 113 as described in FIG. 3. Both horizontal skew and vertical skew have been resolved. Meanwhile, FIG. 7 illustrates an example eye diagram following the resolution of the nonlinearities, in accordance with an alternative method such as FFE. As shown in FIG. 7, the horizontal skew has not been resolved. Compared to FIG. 7, in FIG. 6, an amount of horizontal skew has been reduced by 62.5 percent. In particular, a horizontal skew between the eyes 611 and 621 of FIG. 6 is approximately 0.6 picoseconds compared to 1.6 picoseconds between eyes 711 and 721 of FIG. 7. Therefore, a bit error rate may be reduced using the logic 113 as described in FIG. 3, to a larger extent compared to alternative equalization techniques.

Figure 8A:
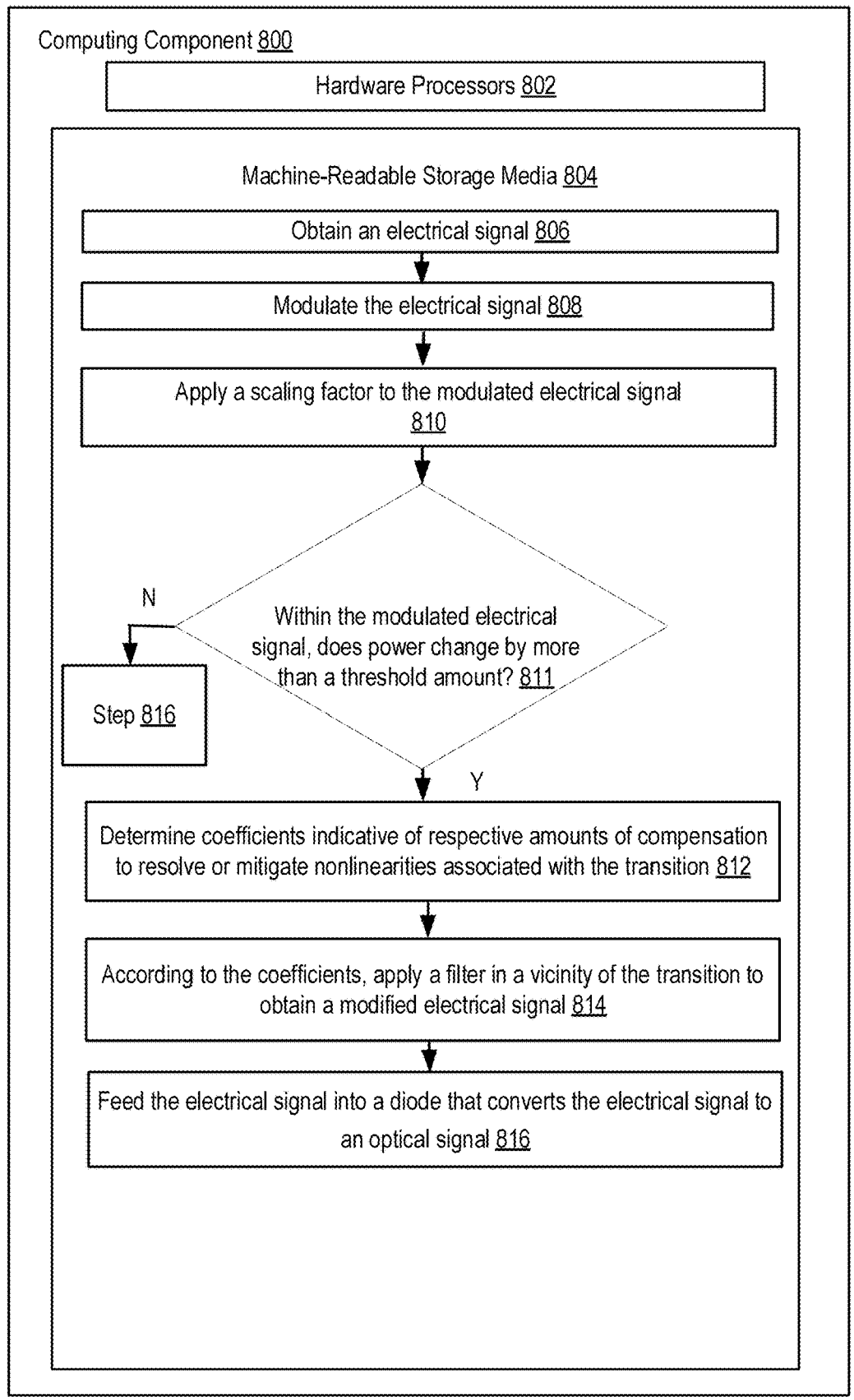
FIG. 8A is an example illustration depicting how a computing component, for example, which includes the logic of FIG. 3, facilitates the resolving of nonlinearities, according to embodiments described in the present disclosure.

FIG. 8A illustrates a computing component 800 that includes one or more hardware processors 802 and machine-readable storage media 804 storing a set of machine-readable/machine-executable instructions that, when executed, cause the hardware processor(s) 802 to perform an illustrative method of resolving nonlinearities of a signal to be transmitted to a destination, while maintaining steady state power levels at each transition and lowering a bit error rate. It should be appreciated that there can be additional, fewer, or alternative steps performed in similar or alternative orders, or in parallel, within the scope of the various embodiments discussed herein unless otherwise stated. The computing component 800 may be implemented as the driver 112, in which the logic 113 may be embedded, as described with respect to FIGS. 1 and 3. The driver 112 may be implemented within a device such as the device 110 of FIG. 1. The machine-readable storage media 804 may include suitable machine-readable storage media described in FIG. 9.

At step 806, the hardware processor(s) 802 may execute machine-readable/machine-executable instructions stored in the machine-readable storage media 804 to obtain an electrical signal, such as the electrical signal 102 of FIG. 1. The electrical signal may be obtained from a data interconnect, for example, from a data center or a computing component such as a server, rack, switch, ASIC (application-specific integrated circuits), or FPGA. Subsequently, at step 808, the hardware processor(s) 802 may execute machine-readable/machine-executable instructions stored in the machine-readable storage media 804 to modulate the electrical signal. The modulation scheme may be according to PAM-4, as illustrated in FIG. 4, or NRZ. Here, due to features of the device 110, nonlinearities may be introduced into the electrical signal. The driver 112 resolves or mitigates the nonlinearities by filtering the modulated electrical signal, in the subsequent steps (e.g., steps 810, decision 811, steps 812, 814) while maintaining steady state powers at each transition of the electrical signal and maintaining a low bit error rate, thereby testifying to an improvement over existing techniques that attempt to resolve nonlinearities.

At step 810, the hardware processor(s) 802 may execute machine-readable/machine-executable instructions stored in the machine-readable storage media 804 to apply a scaling factor to the modulated electrical signal. As alluded to in FIG. 3, the scaling factor may reduce an amplitude of a signal to provide adequate headroom for adjustments such as applying coefficients as described with respect to FIGS. 3 and 5A-5B, so that power levels would stay within bounds or scales of rails of the driver 112. In some embodiments, the scaling factor may be a 7-bit signed value, of which a range is between negative 63 and 63.

Next, at decision 811, the hardware processor(s) 802 may execute machine-readable/machine-executable instructions stored in the machine-readable storage media 804 to determine whether or not, within the modulated electrical signal, power changes by more than a threshold amount at any time intervals. If the power does change by more than a threshold amount, the power change may indicate a transition. Therefore, at decision 811, the hardware processor(s) 802 may detect whether or not a transition is impending, or about to occur. Upon a positive determination, in step 812, the hardware processor(s) 802 may determine coefficients indicative of respective amounts of compensation in order to resolve or mitigate nonlinearities associated with the transition. Details of step 812 will be described in additional detail with reference to FIG. 8B. Following the determination of coefficients, the hardware processor(s) 802 may apply a filter, according to the determined coefficients, in a vicinity of the transition to obtain a modified electrical signal in step 814, such that nonlinearities in the modified electrical signal are suppressed or resolved following application of the filter. The filter, as alluded to in the description of FIG. 3, may include a PID filter. The application of the filter may be localized only to one or two UIs immediately preceding or following the transition to prevent the steady state power at any transition from being changed, which could otherwise result in power nonlinearities and/or increased bit error rates. The UIs may correspond to a sampling frequency. Following the application of the coefficients, the hardware processor(s) 802 may feed the electrical signal into a diode which converts the electrical signal to an optical signal, in step 816. Going back to decision 811, upon a negative determination, that the power does not vary by more than a threshold amount, the modulated electrical signal would then be fed directly into a diode in step 816, without determination of coefficients or applying a filter in steps 812 and 814.

Figure 8B:
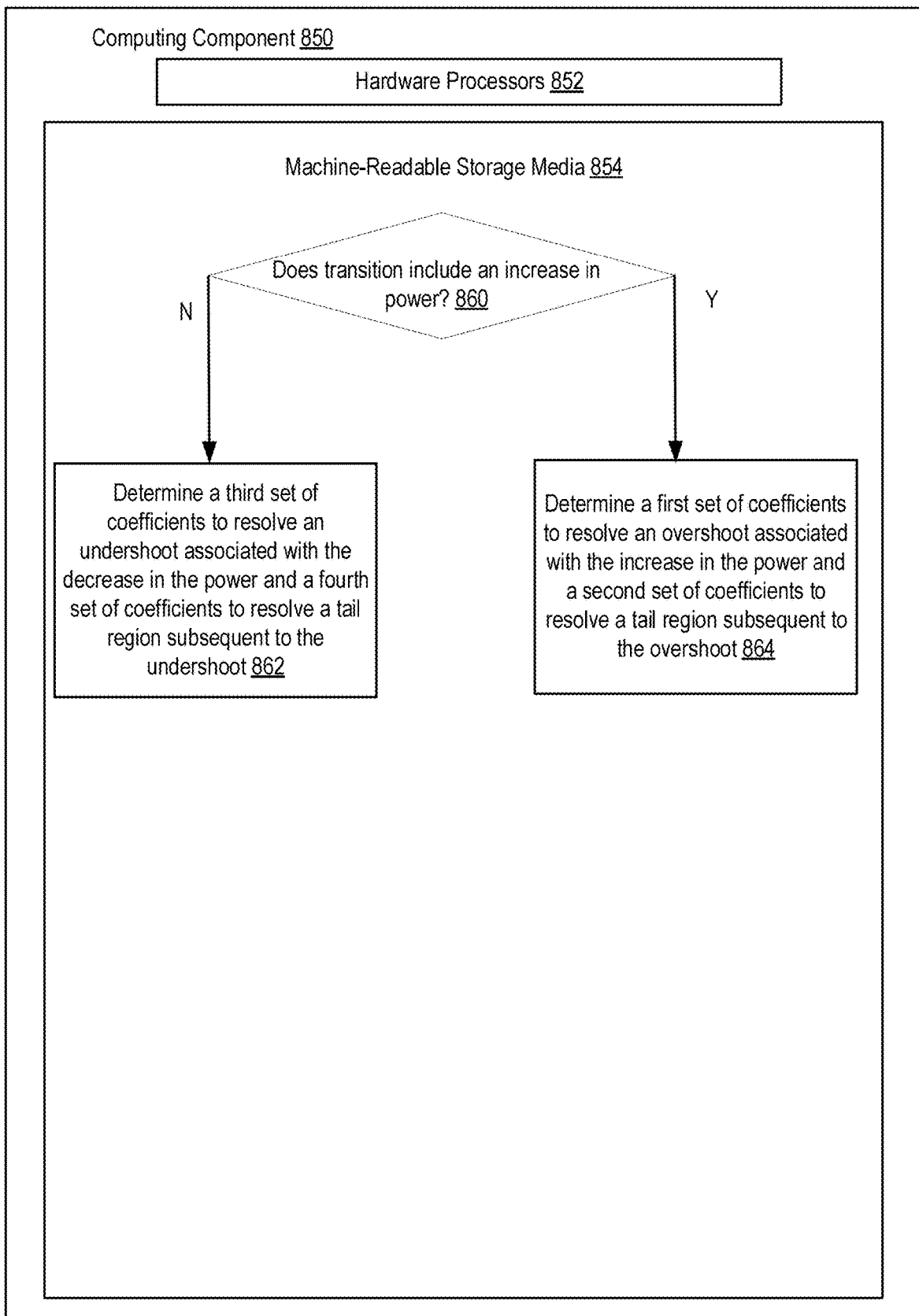
FIG. 8B is an example illustration depicting how a computing component, for example, which includes the logic of FIG. 3, facilitates the resolving of nonlinearities, according to embodiments described in the present disclosure. In particular, FIG. 8B further elucidates step 812 of FIG. 8A.

FIG. 8B illustrates a computing component 850 that includes one or more hardware processors 852 and machine-readable storage media 854 storing a set of machine-readable/machine-executable instructions that, when executed, cause the hardware processor(s) 852 to perform an illustrative method of Determining coefficients indicative of respective amounts of compensation to resolve or mitigate nonlinearities associated with the transition, while maintaining steady state power levels at each transition and lowering a bit error rate. FIG. 8B further elucidates step 812 of FIG. 8A. The computing component 850 may be implemented as the driver 112, in which the logic 113 may be embedded, as described with respect to FIGS. 1 and 3. The driver 112 may be implemented within a device such as the device 110 of FIG. 1. The machine-readable storage media 854 may include suitable machine-readable storage media described in FIG. 9.

In decision 860, upon determination that a transition is occurring, the hardware processor(s) 852 may execute machine-readable/machine-executable instructions stored in the machine-readable storage media 804 to determine whether or not the transition includes or indicates an increase in power. Upon a negative determination, meaning that the transition includes a decrease in power and an upcoming undershoot, the hardware processor(s) 852 would determine a third set of coefficients to resolve the undershoot associated with the decrease in the power and a fourth set of coefficients to resolve a tail region subsequent to the undershoot, in step 862. For example, an undershoot may be manifested as the undershoot 431 as illustrated in FIG. 4, in which a power level momentarily decreases to a level below that of a new transition level (e.g., 430 in FIG. 4). Meanwhile, the tail region may be manifested as the tail region 432, in which a power level momentarily increases to a level slightly above that of the new transition level. A magnitude by which the power level exceeds that of the new transition level in the tail region may be less than a magnitude by which the power level is lower than that of the new transition level in the undershoot. The hardware processor(s) 852 would determine coefficients to resolve or suppress both the undershoot and the tail region.

Meanwhile, upon a positive determination in decision 860, meaning that the transition includes an increase in power and an upcoming overshoot, the hardware processor(s) 852 would determine a first set of coefficients to resolve the overshoot associated with the decrease in the power and a second set of coefficients to resolve a tail region subsequent to the overshoot, in step 864. For example, an overshoot may be manifested as the undershoot 401 as illustrated in FIG. 4, in which a power level momentarily increases to a level above that of a new transition level (e.g., 400 in FIG. 4). Meanwhile, the tail region may be manifested as the tail region 402, in which a power level momentarily decreases to a level slightly below that of the new transition level. As previously alluded to, the tail region may be attributed to the nonlinearities of the device 110. A magnitude by which the power level falls below that of the new transition level in the tail region may be less than a magnitude by which the power level exceeds that of the new transition level in the overshoot. The hardware processor(s) 852 would determine coefficients to resolve or suppress both the overshoot and the tail region. By effectively resolving an undershoot, an overshoot, and a subsequent tail region, the hardware processor(s) 852 would resolve nonlinearities within a signal while addressing both horizontal skew and vertical skew without impacting steady-state power levels at any transitions, thereby improving upon existing mechanisms that attempt to address nonlinearities. The coefficients may be applied in a filter and may be constrained to one or two UIs directly prior to or subsequent to a transition (e.g., a local minimum or local maximum).

Figure 9:
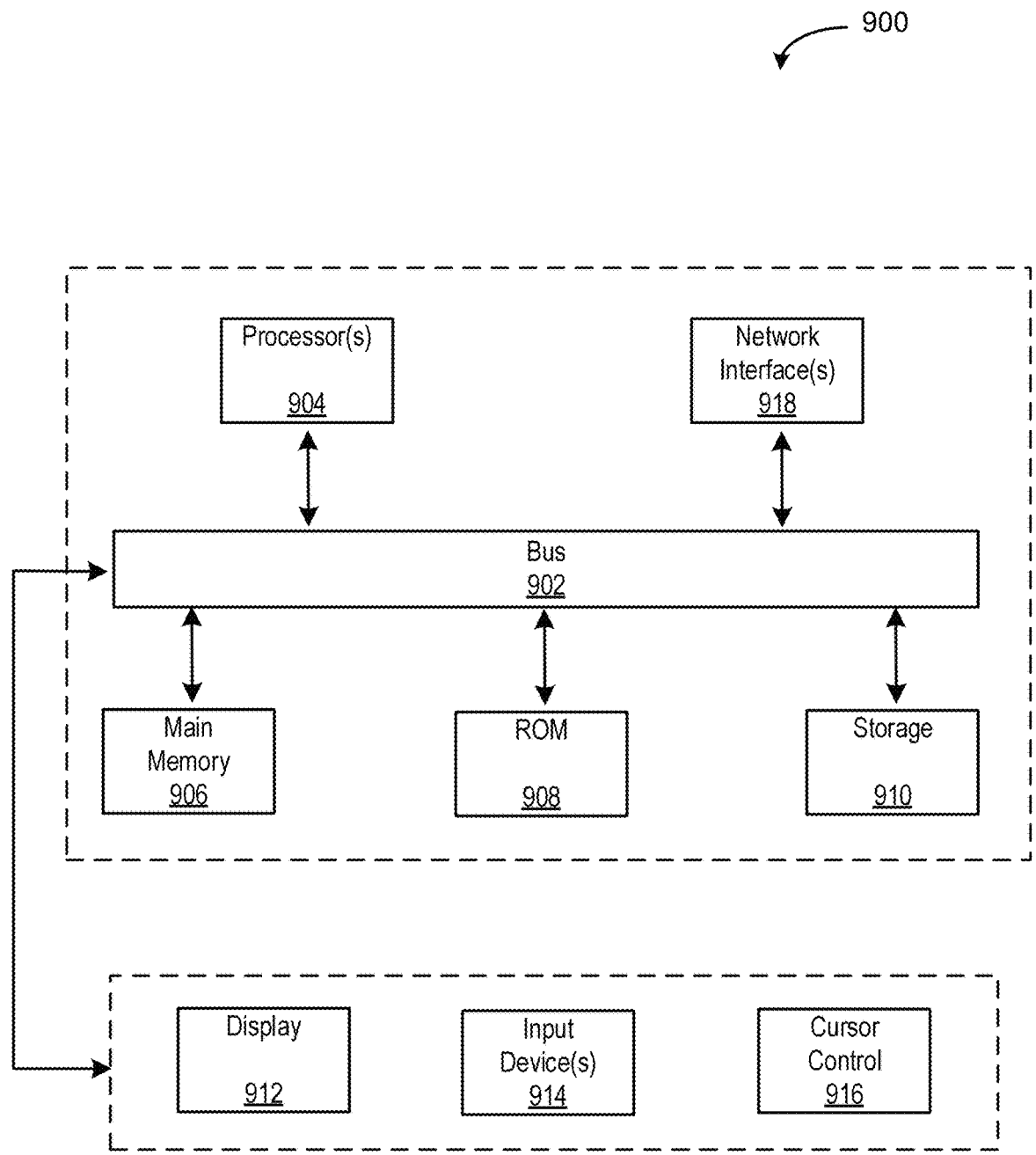
FIG. 9 is an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "component," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A computer-implemented method of transmission between interconnects using an optical or an optoelectronic device, comprising:
    filtering a modulated electrical signal received from a first interconnect, the filtering comprising:
        determining an occurrence of a transition comprising a change in a power of a modulated electrical signal by more than a threshold amount;
        in response to the determination of the occurrence of the transition,
        determining coefficients indicative of respective amounts of compensation to resolve or mitigate nonlinearities associated with the transition;
        according to the coefficients, applying a filter in a vicinity of the transition to obtain a modified electrical signal;
    converting the modified electrical signal into an optical signal;
    transmitting the optical signal across a fiber associated with the optical or the optoelectronic device to a second interconnect.

2. The computer-implemented method of claim 1, further comprising:
    in response to determining an occurrence of a transition, determining whether the change in the power comprises an increase or a decrease in the power; and
    wherein:
        the determination of the coefficients is based on the determination of whether the change in the power comprises an increase or a decrease in the power.

3. The computer-implemented method of claim 2, wherein the determination of the coefficients further comprises:
    in response to determining that the transition comprises an increase in the power, determining a first set of coefficients to resolve an overshoot associated with the increase in the power and a second set of coefficients to resolve a tail region subsequent to the overshoot.

4. The computer-implemented method of claim 2, wherein the determination of the coefficients further comprises:
    in response to determining that the transition comprises a decrease in the power, determining a third set of coefficients to resolve an undershoot associated with the decrease in the power and a fourth set of coefficients to resolve a tail region subsequent to the undershoot.

5. The computer-implemented method of claim 1, wherein the vicinity consists of two time intervals preceding or following a local maximum or a local minimum associated with the transition, wherein the two time intervals are determined respective to a sampling frequency of the electrical signal.

6. The computer-implemented method of claim 1, wherein the determination of an occurrence of a transition is based on five consecutive 2-bit codes corresponding to five respective consecutive time periods.

7. The computer-implemented method of claim 1, wherein the filter comprises a digital-to-analog conversion (DAC)-based filter.

8. The computer-implemented method of claim 1, further comprising:
applying a scaling factor to the electrical signal based on a range of the DAC-based filter prior to the application of the filter, wherein the application of the filter occurs at a mixer.

9. The computer-implemented method of claim 1, wherein steady state power levels of the modified electrical signal are maintained with respect to the modulated electrical signal.

10. The computer-implemented method of claim 1, wherein the optical or the optoelectronic device comprises a vertical-cavity surface-emitting laser (VCSEL).

11. An optical or an optoelectronic device, comprising:
a driver comprising one or more processors;
a memory storing instructions that, when executed by the one or more processors, cause the one or more processors to:
filtering a modulated electrical signal received from a first interconnect, the filtering comprising:
determining an occurrence of a transition comprising a change in a power of the electrical signal by more than a threshold amount;
in response to the determination of the occurrence of the transition, determining coefficients indicative of respective amounts of compensation to resolve or mitigate nonlinearities associated with the transition;
according to the coefficients, applying a filter in a vicinity of the transition to obtain a modified electrical signal; and
a diode to convert the modified electrical signal into an optical signal.

12. The optical or the optoelectronic device of claim 11, wherein the instructions further cause the one or more processors to:
in response to determining an occurrence of a transition, determining whether the change in the power comprises an increase or a decrease in the power, and wherein:
the determination of the coefficients is based on the determination of whether the change in the power comprises an increase or a decrease in the power.

13. The optical or the optoelectronic device of claim 12, wherein the determination of the coefficients further comprises:
in response to determining that the transition comprises an increase in the power, determining a first set of coefficients to resolve an overshoot associated with the increase in the power and a second set of coefficients to resolve a tail region subsequent to the overshoot.

14. The optical or the optoelectronic device of claim 12, wherein the determination of the coefficients further comprises:
in response to determining that the transition comprises a decrease in the power, determining a third set of coefficients to resolve an undershoot associated with the decrease in the power and a fourth set of coefficients to resolve a tail region subsequent to the undershoot.

15. The optical or the optoelectronic device of claim 11, wherein the vicinity consists of two time intervals preceding or following a local maximum or a local minimum associated with the transition, wherein the two time intervals are determined respective to a sampling frequency of the electrical signal.

16. The optical or the optoelectronic device of claim 11, wherein the determination of an occurrence of a transition is based on five consecutive 2-bit codes corresponding to five respective consecutive time periods.

17. The optical or the optoelectronic device of claim 11, wherein the filter comprises a digital-to-analog conversion (DAC)-based filter.

18. The optical or the optoelectronic device of claim 11, wherein the instructions further cause the one or more processors to:
apply a scaling factor to the electrical signal based on a range of the DAC-based filter prior to the application of the filter; and the driver further comprises a mixer at which the filter is applied.

19. The optical or the optoelectronic device of claim 11, wherein steady state power levels of the modified electrical signal are maintained with respect to the modulated electrical signal.

20. The optical or the optoelectronic device of claim 11, wherein the optical or the optoelectronic device comprises a vertical-cavity surface-emitting laser (VCSEL).

* * * * *